Dec. 27, 1955    S. L. MADORSKY    2,728,717
HIGH VACUUM DISTILLATION APPARATUS
Filed April 2, 1946    3 Sheets-Sheet 1

Inventor
Samuel L. Madorsky

By Robert A. [signature]
Attorney

Dec. 27, 1955   S. L. MADORSKY   2,728,717
HIGH VACUUM DISTILLATION APPARATUS
Filed April 2, 1946   3 Sheets-Sheet 3

Inventor
Samuel L. Madorsky
By Robert A. Lavender
Attorney

United States Patent Office 2,728,717
Patented Dec. 27, 1955

2,728,717

HIGH VACUUM DISTILLATION APPARATUS

Samuel L. Madorsky, Washington, D. C., assignor to the United States of America as represented by the United States Atomic Energy Commission Application April 2, 1946, Serial No. 658,948

10 Claims. (Cl. 202—173)

This invention relates to an improvement in distillation apparatus, particularly apparatus for molecular or high vacuum distillation to separate mixtures of liquids into their components. The invention relates more particularly to apparatus for separating an istope of an element from mixture with other isotopes thereof.

In the copending application of Aubrey K. Brewer, Samuel L. Madorsky and T. Ivan Taylor, Serial No. 583,495, filed March 19, 1945, there is disclosed a procedure and apparatus for the separation of the isotopes of an element particularly the isotopes of uranium by forming normally liquid polyalkoxides of a normal isotopic mixture of uranium, and subjecting the mixture to a molecular distillation procedure involving the equivalent of fractional distillation with counter current refluxing. The reflux columns employed in the procedure involve an inclined glass still column, a series of obstructions on the lower side of the still column dividing the liquid therewithin into a series of pools, and series of oppositely inclined cooled surfaces on the upper side of the column on which vaporized material condenses. The condensate flows in a direction opposite to the incline of the column and falls from these cooled surfaces to return to the pools at a point higher in the column than the point of vaporization of the material forming the condensate. The pools of liquid overflow the obstructions and give a flow of liquid down the column as reflux.

Although the pairs of opposed cooling surfaces and liquid surfaces of the pools might be regarded as fractional distillation cells, the openings between the cells are necessarily large so that each cell represents merely a subdivision of the column and not an actual theoretical plate. Due to the large openings between cells there is mixing of the vapor between adjacent cells resulting in a lowering of efficiency of fractionation.

It is an object of the present invention to provide an improved apparatus for distillation.

It is a further object to provide an apparatus for molecular distillation comprising a relatively large evaporating surface and relatively small holdup of liquid within the still.

It is another object to provide a fractional molecular distillation system comprising cells constituting distinct theoretical plates where mixing of the vapor in adjacent plates cannot take place.

It is an additional object to provide an improved apparatus for molecular distillation wherein the distillation is carried out in a series of separate stages and wherein there is obtained effective controlled counter current flow of residue, distillate and distilland.

Applicant has devised apparatus for achieving the above objects comprising a series of stills, reservoirs associated with these stills, and a device for supplying liquid from the reservoirs to the stills. Conduits are provided for flow of distillate from the stills to higher reservoirs, and for conducting residue from the stills to lower reservoirs. The reservoirs are connected for conducting to lower reservoirs liquid entering the reservoirs in excess of the liquid pumped from said reservoirs to their associated columns.

This arrangement insures feed to the higher columns of liquids rich in the more volatile components and feed to the lower columns of liquids rich in the less volatile components with the addition of a correction factor which gives improved operation and simplified control of the rate of pumping of feed liquid to the still column. Also the arrangement permits control over the reflux rate of the system.

The apparatus shown in the drawings is intended only as illustrative to assist in understanding the invention and it is to be understood that the invention is not limited to the apparatus illustrated.

Figure 1:
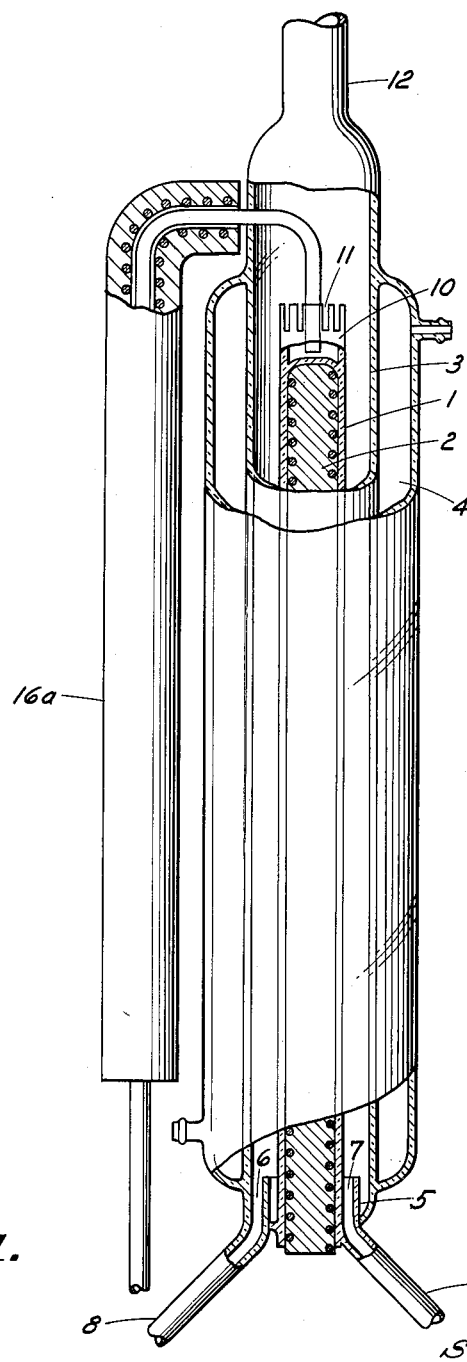
Figure 1 is an elevational view partly broken away of a single column suitable for use in the apparatus in the instant invention.
Figure 2:
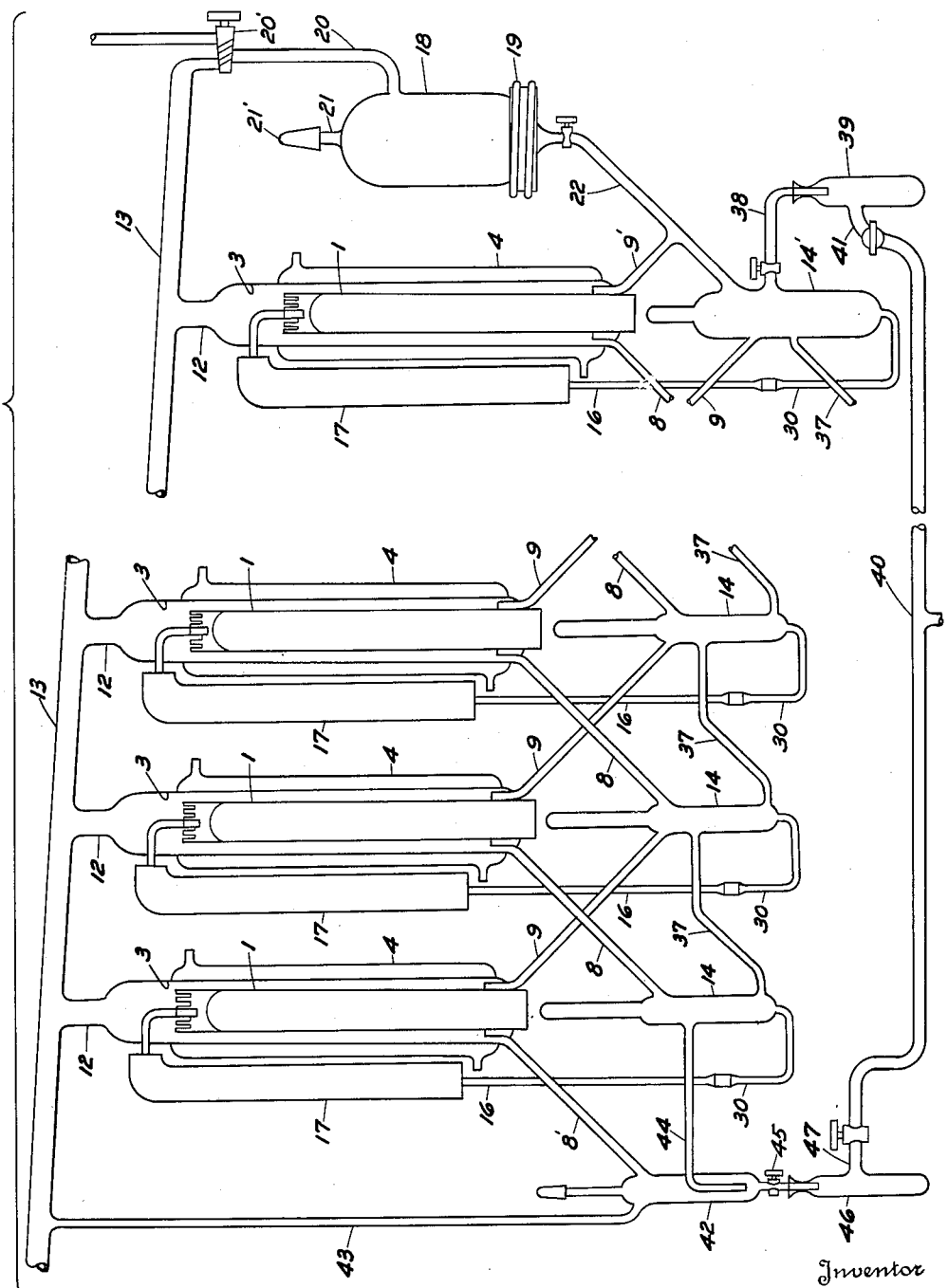
Figure 2 is a diagrammatic showing of a multi-column system constructed in accordance with the instant invention.

The column shown in detail in Fig. 1 comprises a central Pyrex glass tube or evaporator surface 1 heated by Nichrome resistance element 2 within the tube, and an outer condenser tube 3 with its inner surface spaced a distance from the outer surface of the central tube a distance of the order of the mean free path of molecules vaporized from the liquid to be distilled. A water jacket 4 is disposed around the condenser tube 3 to control the condensation surface temperature. The bottom of the annular space between the evaporator surface 1 and condenser tube 3 is divided by means of a ring partition 5 into two annular troughs 6 and 7 with outlet conduits 8 and 9 leading from each trough. At the top of the evaporator is a distributing crown 10 provided with notches 11 through which the liquid to be evaporated flows to the surface of the tube 1. An outlet conduit 12 is provided at the top of the column for connection to a vacuum pump (not shown) through a manifold 13 (see Fig. 2). The tube 1 is covered with a layer of sintered glass granules (not shown) of about 2- to 40 mesh to facilitate mixing of the components of the liquid and uniform distribution of the liquid on the tube surface. The outlet trough 6 is disposed to receive condensate from the condensing surface 3 and discharge it from the column through the conduit 8. The inner trough 7 is disposed to receive unevaporated liquid, i. e. residue, from the evaporating surface and discharge it from the column through the conduit 9. Each column is provided with a glass reservoir 14 having an internal pump 15, the reservoir being disposed in position to receive liquids from the columns by gravity flow. As shown in Fig. 2 the reservoir 14' associated with the first column, i. e. at the right end of the drawing, is somewhat larger than the remaining reservoir 14. Each column is provided with a feed conduit 16 surrounded by a heating unit 17 which preheats liquid passing through the conduit before introducing it into the column.

The general arrangement of a multi-column system is shown diagrammatically in Fig. 2. The columns are arranged in ascending order from right to left. A degassing reservoir at the lower end of the system comprises, as shown in Fig. 2, a chamber 18, a heater 19 associated therewith, a conduit 20 leading to the vacuum manifold 13, a conduit 21 for introducing liquid to the chamber and a valved conduit 22 leading to the large reservoir 14' associated with lowermost column. A valve 20' is provided in conduit 20. In one position, the valve opens conduit 20 to the vacuum manifold 13, and in another position the valve opens conduit 20 to a source of dry deoxygenated nitrogen and closes the conduit 20 to the manifold 13. Cap 21' is provided for closing conduit 21 after introduction of liquid to be distilled. The conduit 22 joins with the residue conduit 9' of the lowermost column and the liquid from the two conduits enters the reservoir 14'. The residue conduit 9 of each of the remaining columns leads to the reservoir 14 of the next lower column. The condensate conduit 8 of each of the columns except the highest leads to the reservoir associated with the next higher column. The condensate conduit 8' of the highest column leads to the reservoir 42 which is also connected to the vacuum manifold 13 by conduit 43.

Figure 3:
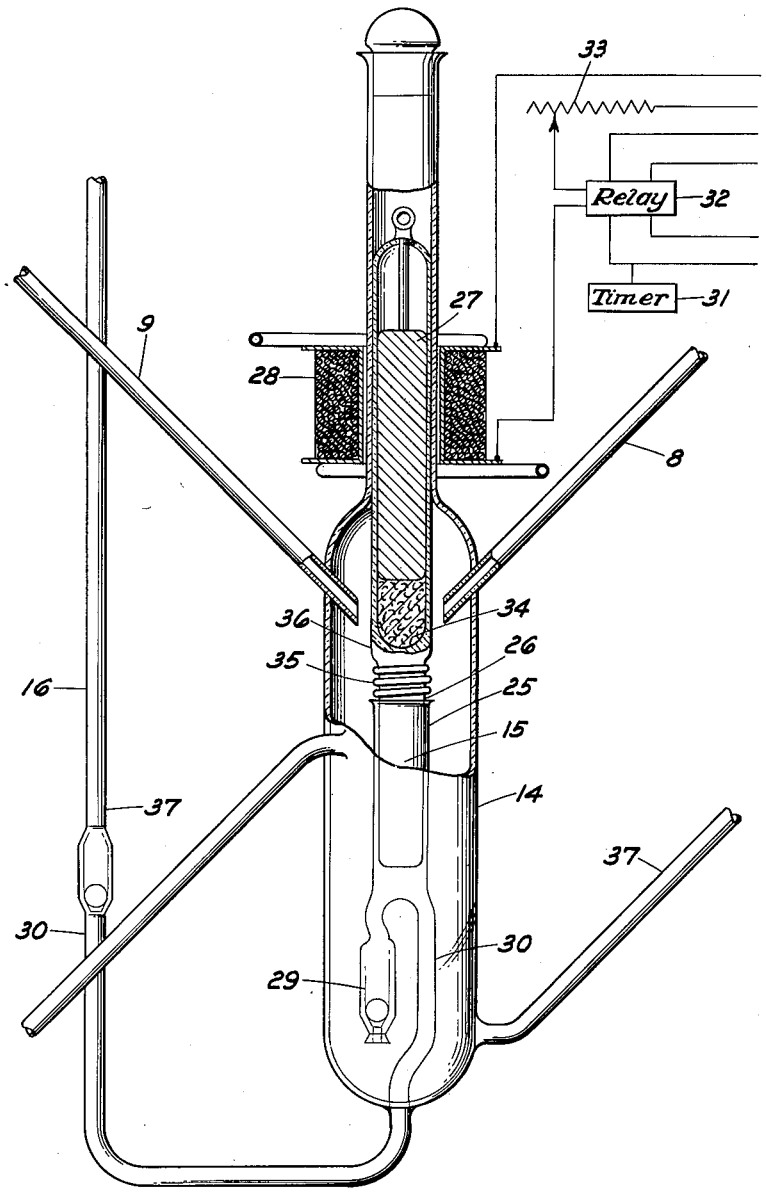
Figure 3 is a detail view showing the relation between the various conduits and the pump and valve device found suitable for use in the instant invention.

The pump 15 within the reservoir 14 comprises (see Fig. 3) a pump barrel 25 within the reservoir 14, a plunger 26 containing an iron core 27 in its upper part, and a solenoid 28 for actuating the plunger 26. A check valve controlled conduit 29 connects with the pump barrel 25 for passage of liquid from the reservoir to the pump barrel 25, and a second check valve controlled conduit 30 is connected to receive liquid forced from the pump barrel by the plunger 26. The current for operating the solenoid 28 is controlled by means of timer 31 and relay 32 as shown in Fig. 3. In operation the core 27 is raised when the solenoid 28 is activated by passing current therethrough, and liquid from the reservoir 14 enters the pump barrel 25 through the check valve conduit 29. When the current is cut off the plunger falls and forces the liquid in the pump barrel through the tube 30 and the conduit 16 leading to the still column. The rate of pumping of the individual pumps may be controlled by changing the position of the solenoid 28 with respect to the center of the iron core 27, or may be controlled by means of the slide resistance 33 in the solenoid circuit. Asbestos wool or other relatively inert resilient material 34 may be placed to cushion the fall of the iron core 27 within plunger 26 when the current is cut off. A spring 35 between the upper edge of the pump barrel 25 and enlargement 36 on the plunger cushions the downward movement of the plunger.

In order to balance the operation in a multi-still apparatus it is desirable to have the same pumping rate for all columns and, in the second place, to evaporate half of the total liquid pumped to each column. This is almost impossible to accomplish by control of the pumping rate of the individual pumps. In the operation of the apparatus of the instant invention, the heating within the individual columns may be individually controlled so that slightly more than half of the liquid pump is evaporated in each column, and to prevent the liquid from crowding up in the reservoir towards the higher end of the system, overflow conduits 37 are provided. These overflow conduits carry to the next lower reservoirs liquid from each reservoir in amount corresponding to the excess over 50% of the total liquid pumped. The flow of excess liquid to the lower reservoir balances the pumping and evaporating rate.

A side arm 38 on the enlarged reservoir 14' at the lowermost end of the series of columns leads to a product receiver 39. This receiver 39 is connected to a vacuum pump, not shown, through manifold 40 and the valved conduit 41.

Condensate from the uppermost column of the series passes through condensate discharge conduit 8' to product receiver 42 which is connected to the vacuum manifold 13 by conduit 43. This condensate receiver is provided with an overflow conduit 44 leading to the reservoir associated with the uppermost column of the series. A valve controlled conduit 45 leads to a product receiving container 46. This product receiver is connected by a valved conduit 47 with the vacuum manifold 40.

*Example of operation*

A ten-column system was first evacuated by means of a mechanical oil pump and mercury vapor pump to a sticking vacuum, i. e. to a pressure of about $10^{-5}$ mm. of Hg of uncondensable gases. The preheating and degassing chamber reservoir was then isolated from the rest of the apparatus by closing the valve in conduit 22, and turning valve 20' to fill the reservoir with dry deoxygenated nitrogen. Uranium pentaethylate, wherein the uranium was the normal isotopic mixture, was next introduced into this reservoir, cap 21' put in place, the reservoir connected to the vacuum manifold by turning valve 20' (Fig. 2) and the liquid heated until all of the dissolved gas was eliminated. The liquid was then allowed to pass through conduit 22 by opening the valve therein to the reservoir 14'. The preheating reservoir 18 is then isolated by operating valve 20' and the valve in conduit 22, heaters, preheaters, pumps and cooling water turned on and full operation started.

Samples were taken from reservoir 14' (heavy) and from reservoir 42 (light). The sampling operation was carried out into evacuated receivers, as shown in Fig. 2 without interrupting the operation of the whole system. After taking the samples, the sampling tubes were broken off the vacuum line, cleaned and sealed on again.

The results from two runs are as follows:

|  | Run I | Run II |
| --- | --- | --- |
| g. liquid pumped in each column/hr | 1,646 | 1,646 |
| g. overflow liquid in each column/hr | 102 | 106 |
| g. liquid evaptd. in each column/hr | 874 | 876 |
| g. liquid evaptd. per sq. cm./hr | 2.91 | 2.91 |
| Temp. of evaporating surface °C | 110.4 | 110.4 |
| Aver. temperature of heaters °C | 152.5 | 149 |
| Aver. temperature of preheaters °C | 116.3 | 120 |
| No. of strokes of pump per min | 15 | 15 |
| Amount of liquid evaporated in percent of that pumped, on the average | 53.1 | 53.3 |
| Analysis: Difference in the amount of the light constituent between light and heavy samples, as determined on the mass spectrometer percent | 0.97 | 1.16 |
| average difference do | 1.065 |  |

A system of 10 columns actually corresponds to 9.5 columns, because the residue in column 1 is returned to its own reservoir. Thus, separation or concentration of the light constituent per column is equal to $1.065/9.5 = 0.11\%$.

The apparatus comprising a series of columns with associated reservoirs and connecting conduits combines the advantages of a large evaporating surface, i. e. of the heated central tubes within the series of columns, with that of a small hold-up, the heated liquid layer being very thin as compared with the liquid layer in the pools of an inclined fractionation column. Another important factor is the mixing of the liquid while it flows over the rough surface of the individual columns which reduces depletion of the liquid surface in the more volatile component. Also separation of the components is improved by returning mixed condensate, residue and overflow liquids in the reservoir associated with one column to a reservoir associated with a lower column for distillation in the lower column.

It should be noted that by control of the individual rates of pumping and/or the temperatures of the heated surfaces within the individual columns the ratio of condensate to residue of each column may be individually controlled. For example by increasing the rate of pumping the proportion of residue may be increased and this residue passes to the lower reservoirs through the residue conduit and the overflow conduits, resulting in an increase in the effective reflux ratio.

It should be understood that the specific example is not limiting, and it is apparent that the present invention is applicable to the concentration of mixtures of liquids differing in their molecular weights or vapor pressures but having similar properties otherwise.

I claim:
1. Apparatus for distillation comprising a series of stills, reservoirs associated with said stills, means for supplying liquid from said reservoirs to said stills, conduits leading from each still except the last for conducting distillate to a reservoir associated with a succeeding still, conduits leading from each still, except the first, for conducting residue to a reservoir associated with a preceding still, and overflow conduits leading from each reservoir, except the first, to a preceding reservoir.

2. Apparatus as defined in claim 1 wherein distillate from the last still is returned to a reservoir associated with one of the stills.

3. Apparatus as defined in claim 1 wherein residue from the first column is returned to the reservoir associated with that still.

4. Apparatus for distillation comprising a series of still columns, reservoirs associated with said columns, means for supplying liquid at variable rates from said reservoirs to said columns, conduits leading from each column except the last for conducting distillate to a reservoir associated with a succeeding column, conduits leading from each column except the first for conducting residue to a reservoir associated with a preceding column, and overflow conduits leading from each reservoir, except the first to a preceding reservoir.

5. Apparatus for molecular distillation comprising a series of molecular distillation stills, reservoirs associated with said stills, means for supplying liquid from said reservoirs to said stills, conduits leading from each still except the last for conducting distillate to a reservoir associated with a succeeding still, conduits leading from each still, except the first, for conducting residue to a reservoir associated with a preceding still, and overflow conduits leading from each reservoir, except the first, to a preceding reservoir.

6. Apparatus for molecular distillation comprising a series of molecular distillation stills each still comprising a heated surface, means to flow liquid in a thin film thereover, and a cooled condensing surface, reservoirs associated with said stills, means for supplying liquid at variable rates from said reservoirs to said stills, conduits leading from each still except the last for conducting distillate to a reservoir associated with a succeeding still, conduits leading from each still, except the first, for conducting residue to a reservoir associated with a preceding still, and overflow conduits leading from each reservoir, except the first, to a preceding reservoir.

7. Apparatus for molecular distillation comprising a series of molecular distillation still columns, each column comprising a heated surface, means to flow liquid into a thin film thereover, and a cooled condensing surface, a reservoir associated with each of said columns, means for supplying liquid from each reservoir to its associated column, distillate conduits leading from each column except the last for conducting distillate to the reservoir associated with the succeeding column, residue conduits leading from each column except the first for conducting residue to the reservoir associated with the preceding column, and overflow conduits leading from each reservoir except the first to its preceding reservoirs.

8. Apparatus for high vacuum distillation comprising a series of high vacuum distillation still columns, each column comprising a heated surface, means to flow liquid thereover in a thin film, and a cooled condensing surface, reservoirs associated with said columns, means for supplying liquid at variable rates from each reservoir to the top of its associated column, conduits leading from each column except the last for conducting distillate to the reservoir associated with the succeeding column, conduits leading from each column except the first for conducting residue to the reservoir associated with the preceding column, and overflow conduits leading from each reservoir except the first to its preceding reservoir, for conducting liquid from one reservoir to the preceding reservoir at a volume rate equivalent to the volume rate of the excess liquid entering each reservoir over the volume rate of liquid supplied from said reservoir to its associated still column.

9. Apparatus for molecular distillation comprising a series of molecular distillation still columns, each column comprising a heated relatively rough surface, means to flow liquid thereover in a thin film, and a cooled condensing surface, a series of reservoirs associated with said columns, each reservoir being disposed at a higher level than the preceding reservoir, means for supplying liquid from each reservoir to the top of its associated column, conduits leading from each column except the last for conducting distillate to the reservoir associated with the succeeding column, conduits leading from each column except the first for conducting residue to the reservoir associated to the preceding column, and overflow conduits leading from each reservoir except the first to the preceding reservoir, the liquid head resulting from the successively higher levels of the succeeding reservoirs being sufficient to cause liquid to pass from one reservoir to the preceding reservoir at a volume rate equivalent to the volume rate of the excess of liquid entering each reservoir over the volume rate of liquid supplied from said reservoir to its associated still column.

10. Apparatus for molecular distillation comprising a series of molecular distillation still columns, each column comprising a heated relatively rough surface, distributing means to feed liquid over the heated surface in a thin film and a cooled condensing surface, a series of reservoirs associated with said columns, each reservoir being disposed at a higher level than the preceding reservoir, feed conduits leading from each reservoir to its associated still column, means for forcing liquid at independently variable rates from each reservoir to the top of its associated column through said conduits, conduits leading from each column except the last for conducting distillate to the reservoir associated with the succeeding column, conduits leading from each column except the first for conducting residue to the reservoir associated with the preceding column, and overflow conduits leading from each reservoir except the first to the preceding reservoir, the flow capacity of said overflow conduits being sufficient that the liquid head resulting from the successively higher level of the succeeding reservoir is sufficient to cause liquid to pass from one reservoir to the preceding reservoir at a volume rate equivalent to the volume rate of the excess of liquid entering each reservoir over the volume rate of liquid forced from said reservoir to its associated still column.

References Cited in the file of this patent

UNITED STATES PATENTS

| | | |
|---|---|---|
| 2,073,202 | Fawcett et al. | Mar. 9, 1937 |
| 2,128,223 | Fraser | Aug. 30, 1938 |

FOREIGN PATENTS

| | | |
|---|---|---|
| 164,407 | Great Britain | June 8, 1921 |